Aug. 31, 1954   D. F. SHELDON   2,688,103
STATOR FOR ROTATIVE ELECTRICAL APPARATUS
Filed July 16, 1952
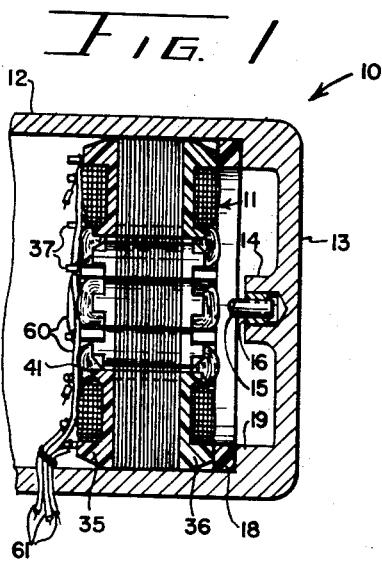
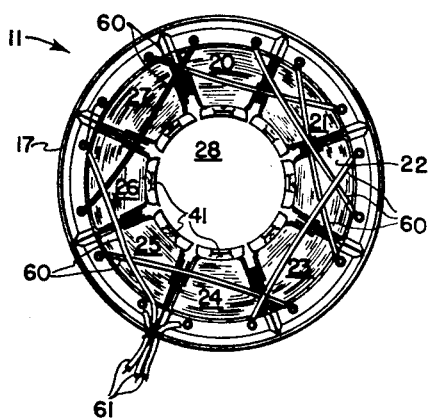
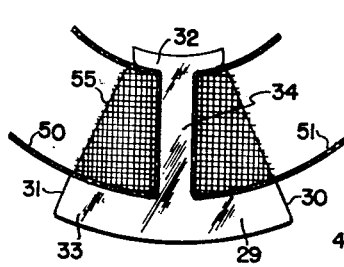
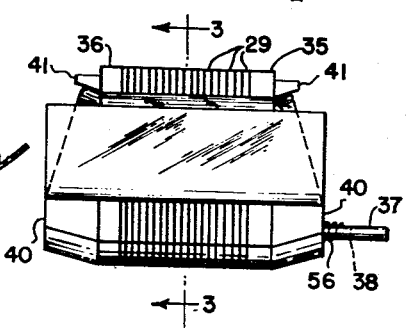
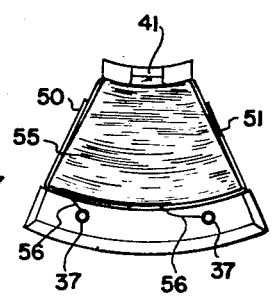
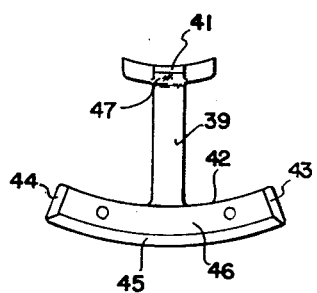
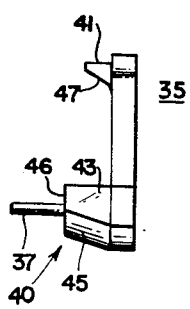
INVENTOR.
DONALD F. SHELDON
BY George H. Fisher
ATTORNEY Patented Aug. 31, 1954

2,688,103

UNITED STATES PATENT OFFICE 2,688,103

STATOR FOR ROTATIVE ELECTRICAL APPARATUS

Donald F. Sheldon, Minneapolis, Minn., assignor to Minneapolis-Honeywell Regulator Company, Minneapolis, Minn., a corporation of Delaware Application July 16, 1952, Serial No. 299,190

10 Claims. (Cl. 310—254)

This invention pertains to rotative electrical apparatus such as motors and generators and particularly to the stator structure thereof.

An object of the invention is to improve multipolar stators for electrical devices by abutting each end of the stack of stator laminations with a novel end piece insulator comprising shoulder means which define and increase the size of the winding space and terminal means included in said shoulder means for securing the ends of the coils on the stator.

An additional object of the invention is to provide an improved stator for a rotating electrical device wherein the amount of space available for the winding of coils is increased over the prior art, the outside diameter and the axial length of the stator remaining constant. Stated otherwise, the additional object of the invention is to increase the output rating of a stator without increasing the physical size of the stator.

Another object of the invention is to increase the ratio of copper to iron in a stator for an electrical device.

Still another object of the invention is to provide a novel end piece insulator for a stack of laminations that provides means for retaining a plurality of turns of wire on the stack and also serves as a terminal support.

A further object of the invention is to eliminate the need of a separately fabricated coil bobbin for the coils on a stator.

A further object of the invention is to provide a novel method of assembling a stator for an electrical device.

This invention has special value in the manufacture of relatively small electrical rotative devices since the invention results in an unusually powerful machine for its size. However, it is to be understood that the novel features contained herein are not limited to small machines alone but are applicable to all sizes of machines.

Other objects and advantages of the invention will be apparent from the following description of a preferred embodiment of the invention, reference being had to the accompanying drawings, in which:

Figure 1 and Figure 2 show an assembled stator, approximately double size; Figure 1 being a view in section of the stator in a stator housing, and Figure 2 being a plan view of the stator as assembled in an annular ring prior to its insertion into the stator housing.

Figures 3, 4, and 5 are cross-section, side, and end views respectively of one of the segments of which the stator is composed.

Figures 6 and 7 are plan and side views respectively of the coil retaining stack end insulator.

Figures 3–7 are twice the scale of Figures 1 and 2.

Referring to Figure 1, the numeral 10 generally indicates part of an electrical device comprising a stator 11 mounted in a hollow cylindrical stator housing 12, one end 13 of which has an inwardly extending annular hub portion 14 which supports a rotor shaft 15 by means of a suitable bearing 16. An annular washer-like spacer 18 made out of an insulation material such as Bakelite is positioned inside stator housing 12 so that it abuts against an inner annular shoulder portion 19 of stator housing 12. The purpose of spacer 18 and shoulder portion 19 will be discussed later.

Figure 2 is a plan view of stator 11 as circumscribed and retained in circular form by an annular ring 17, the purpose of which will also be discussed later. A plurality of separable segments or pole pieces 20–27 jointly make up the stator 11 and form a cylindrical member having an inner rotor opening 28. Each of the pole pieces 20–27 comprise an inner arcuate portion or pole face which forms part of the circular rotor opening 28 and an outer arcuate portion or yoke portion which abuts against the inside of the annular ring 17 or against the inside of the circular stator housing 12, whichever the case may be, depending on the stage of assembly.

Each of the pole pieces 20—27 (see Figure 3 to 7) comprises a plurality of laminations 29 arranged in a stack. Figure 3 shows that each lamination 29 comprises an inner arcuate portion 32, an outer arcuate portion 33, and a winding portion 34 which joins the aforesaid inner and outer arcuate portions 32 and 33 respectively. The extremities 30 and 31 of the outer arcuate portion 33 of the lamination 29 are coincident with radial lines drawn from the center of rotor opening 28. Smoothly abutting each end of the stack of laminations are end piece insulators 35 and 36. The end piece insulators 35 and 36 are made out of a plastic material such as Bakelite and are identical to one another with the exception that end piece insulator 35 has two terminal pins 37 embedded therein, the function of which will be explained later. The end piece insulators 35 and 36 are so shaped that they have a plan outline that is substantially congruent with the plan outline of the individual laminations 29. This is illustrated by a comparison of Figures 3 and 6. Thus, when the stack of laminations 29 are assembled and each end thereof abutted with end piece insulators 35 and 36, continuous inner and outer arcuate surfaces and continuous winding surfaces are formed. Outer and inner shoulder portions 40 and 41 on the end piece insulators 35 and 36 extend away from the stack of laminations. The outer shoulder portion 40 is characterized by having its inner periphery 42 perpendicular to the plane of the end piece insulator 35 and its remaining three surfaces 43, 44, and 45 tapered inwardly. The four side surfaces 42, 43, 44, and 45 of the outer shoulder portions 40 are intersected by an end surface 46 which is parallel to the winding portion 39 of the end piece insulators. The terminal pins 37 embedded in end piece insulator 35 project from the end surface 46 on the outer shoulder portion 40 of the end piece insulator 35. Since end piece insulator 36 has no terminal pins (in the embodiment shown), the end surface 46 on it provides a plane surface perpendicular to the axis of stator 11, the purpose of which will be explained later. The outer shoulder portions 40 project from the end piece insulators 35 and 36 along their entire outer arcuate portions. In the embodiment shown, the inner shoulder portion 41 projects from the plane of the insulator along that portion of the inner arcuate surface that is in line with the winding portion 39, winding portion 39 comparing to winding portion 34 on the laminations 29. The inner shoulder portion 41 has three side surfaces perpendicular to the plane of the insulator, and a fourth side surface 47 that tapers inwardly to join the winding surface 39. It should be understood, however, that the invention should not be limited to the particular shape of inner shoulder portion 41 as shown in the figures. One obvious modification is for inner shoulder portion 41 to extend along all of the inner arcuate portions of end piece insulators 35 and 36.

Subsequent to the assembly of the laminations 29 and the end piece insulators 35 and 36, two thin sheets of insulating material 50 and 51 with a suitable adhesive (not shown) on the backs thereof are disposed against the winding surfaces of the assembled laminations and end piece insulators as shown in Figures 3, 4, and 5. The insulation inserts 50 and 51 may be made out of any suitable insulation material; one that has worked very satisfactorily being varnished cambric. The insulation inserts 50 and 51 are so shaped so that all of the winding surfaces on the assembled laminations and end piece insulators are covered thereby. A coil 55 is then wound about that part of the pole piece, defined by the winding surfaces and the winding portion 39 on the end piece insulators. The coil 55 is wound somewhat in the shape of a truncated pyramid; it being bounded in part by the inwardly facing peripheries of the inner and outer arcuate portions of the laminations 29 and the end piece insulators 35 and 36 and in part by the outer and inner shoulder portions 40 and 41 respectively of the end piece insulators, shoulder 41 precluding any of the turns of the coil 55 from slipping over the end of the stack into the rotor opening 28 of the stator.

The ends 56 of the coil 55 are secured to the terminal pins 37 by any suitable means such as soldering (not shown). In practice, the coil ends 56 are fastened to the terminal pins 37 as close as possible to the end surface 46 of the outer shoulder portion 40 of end piece insulator 35. Then the surplus terminal remaining can be removed as at dotted line 38 if desired. To do so would reduce the axial length of the stator 11 which, in many instances, would be quite advantageous.

The shoulder portions 40 and 41 on the end piece insulators 35 and 36 allow a much greater amount of wire to be wound on a pole piece than would otherwise be possible. In practice, after the coil 55 has been wound, the ends of the insulation inserts 50 and 51 are folded over one another in an overlapping fashion (see Figure 5) so that the coil is protected on all surfaces except for its ends (where no extra insulation is required) by at least one layer of insulation. The plurality of pole pieces 20—27 are then assembled as stator 11 in a fixture (not shown) which in general is a clamp-like device having a circular opening, the diameter of which is adjustable. The fixture is adjusted so that it applies an inwardly directed circumferential pressure to the group of pole pieces, the pressure causing the pole pieces to fit tightly together. At this point, stator 11 is pressed directly from the fixture into the annular ring 17 as shown in Figure 2, the transfer being effected with substantially no reduction in the circumferential pressure exerted on the stator.

All of the extremities 30 and 31 of the outer arcuate portions 33 of laminations 29 form smooth surfaces which evenly abut a similar cooperating surface on the adjacent pole piece of the stator. Thus, in Figure 2 for example, the extremities 30 and 31 of pole piece 24 cooperate with extremities 31 and 30 respectively of adjacent pole pieces 23 and 25 to provide a low reluctance path for the yoke portion of the magnetic circuit of stator 11.

After the plurality of pole pieces are assembled in the annular ring 17, the interconnections between associated pole pieces of the stator 11 are made, the arrangement in Figure 2 being the interconnections that are used on a two-phase induction motor.

The wires 60 interconnecting the ends 56 of the coils 55 on the various pole pieces 20—27 are also fastened to the terminal pins 37, as are the leads 61 which provide power to the stator 11 from an external source (not shown).

At this point in practice the whole assembly of the stator 11 held by the annular ring 17 is vacuum impregnated in a resin varnish. Subsequent to the impregnation of the stator unit 11, it is pressed as a unit from the annular ring 17 into the stator housing 12, again with substantially no reduction in the circumferential pressure exerted on it. The stator 11 is pushed into housing 12 until the end surfaces 46 on the outer shoulder portion 40 of the end piece insulators 36 abut against spacer 18 which in turn abuts against the inner annular shoulder 19 of housing 12. Shoulder 19 and spacer 18 positively position stator 11 with respect to housing 12, so that the distance from the end 13 of housing 12 to the rotor opening 28 can be fixed and also so that the axis of stator 11 will coincide with the axis of housing 12. Spacer 18 allows the stator 11 to be precisely positioned with respect to the stator housing 12 and also provides an adequate leakage path at this point of contact of the stator and housing between the coils 55 and the housing 12.

The use of spacer 18 and inner annular shoulder 19 is an optional one in the invention. While the illustrated embodiment of the invention shows spacer 18 and inner annular shoulder 19, it should be understood that the invention also contemplates the insertion of the stator 11 into an unobstructed hollow stator housing, the diametrical dimensions of the stator and housing being such that the former fits tightly into the latter, the tight fit along positioning the members with respect to one another. In both this last embodiment and in the embodiment shown, it is essential that there be a substantial circumferential pressure exerted on the stator 11 at all times so that it retain its assembled form and so that the individual pole pieces fit tightly together at surfaces 30 and 31, thus providing a low reluctance magnetic path around the stator yoke.

It will be seen in Figure 2 that each inner arcuate portion of a pole piece forming a pole face is of a maximum width (consistent with accepted engineering practice), almost touching its adjacent pole face portions. The width of each pole face portion is determined by a central angle, the magnitude of which is the function of the number of pole pieces in the stator 11 with an allowance for a slight gap between adjacent pole face portions. Each of the windings 55 being shaped somewhat like a truncated pyramid, fit within and substantially fill the above mentioned central angles.

The purposes of the tapered edges 43, 44, and 45 on the outer shoulder portions 40 of the end pieces insulators 35 and 36 are twofold. First, they facilitate the transfer of the stator 11 from the annular ring 17 into the cylindrical stator housing 12, and secondly they inherently provide a long leakage path from the terminal pins 37 to the stator housing 12 and also between terminal pins 37 on adjacent stator pole pieces.

It will be appreciated that the instant invention results in a very efficient use of the space available for coil winding. The tightly abutting pole pieces of the stator provide a comparatively low reluctance path for the magnetic circuit through extremities 30 and 31 of the laminations 29, the reluctance of the magnetic circuit being further reduced by the inner arcuate or pole portions 32 being of maximum width. While having the inner arcuate portion 32 wider than the winding portion 34 prevents the use of prewound coils, it has resulted in a very efficient design whereby considerably more copper can be wound on the pole pieces than would otherwise be possible with prewound coils. The winding of the coil directly about the assembled laminations and end piece insulators results in all the winding space between the inner and outer arcuate portions to be employed. That is, the coil 55 smoothly abuts the entire inner periphery of the outer arcuate portions 33. In previous designs, much available winding space has been lost due to the fact that it has been necessary to have this portion of the lamination perpendicular to a radial line bisecting the laminations in order that a prewound coil could be used or else it was necessary to have a separate bobbin with winding sides perpendicular to the bisecting line. These bobbins, which sometimes also served as a mounting for the terminals of the coil were bulky and considerably reduced the amount of space available for coil winding. In the instant invention, it is not necessary to have a bobbin since the shoulder portions 40 and 41 on the end piece insulators 35 and 36 together with the inner peripheries of the inner and outer arcuate portions of the assembled laminations 29 and end piece insulators 35 and 36 serve to define the shape of the coil 55, and the insulation inserts 50 and 51, although quite thin, adequately insulate the coil from the stack of laminations. It will be appreciated that in a truncated pyramid-shaped coil such as is employed in the instant invention, any increase that can be achieved in the amount of winding space near the outer periphery thereof is very effective since it is at that point that the maximum change of volume per unit increase of the length of the coil occurs. The result of the invention is that on a given amount of iron available for a stator, it is possible to wind more copper than was done heretofore and consequently since the ratio of copper to iron has increased, a more compact and powerful machine results.

In an application of the invention where stator 11 is used in a velocity signal generator, it has been found desirable to reduce the width of the pole face on the laminations to the point where the pole face is no wider than the winding portion 34 of the laminations. This reduces the zero speed signal output of the device. The configuration of the remainder of the stator including the end piece insulators is the same as in the illustrated embodiment.

In this disclosure, stator 11 has been described as comprising pole pieces having a coil and two terminal pins embedded in outer shoulder portion 40 of end piece insulator 35. It is to be understood that one of the many modifications of the device that comes within the scope of the invention is to have more than one coil per pole piece and to have terminal pins in both end piece insulators 35 and 36. Therefore, in considering this invention it should be kept in mind that the present disclosure is intended to be illustrative only and the scope of the invention is to be determined only by the appended claims.

I claim as my invention:

1. In an electrical device having at least one rotating element, a plurality of pole pieces which collectively form a cylindrical stator, said pole pieces each comprising a plurality of laminations arranged flatwise in an axial stack having two ends; an end piece insulator abutting each of said ends; said laminations and said end piece insulators having plan outlines substantially congruent with one another, said laminations and said end piece insulators jointly and severally comprising an inner arcuate portion forming a part of the inner surface of said cylinder, an outer arcuate portion forming a part of the outer surface of said cylinder, and a winding leg portion joining said inner and outer arcuate portions, said end piece insulators including coil retaining shoulder portions extending away from said stack in substantially an axial direction, said shoulder portions comprising outer shoulder portions adjacent said outer arcuate portions and inner shoulder portions adjacent part of said inner arcuate portions; terminal means secured to said end piece insulators; a plurality of turns of wire having at least two connection ends, said turns being wound about said winding leg portion and disposed between and retained by said inner and outer shoulder portions, said connection ends being secured to said terminal means; and insulation means disposed between said turns and the winding leg portions of said stack of laminations and said end piece insulators.

2. In combination, a stator housing and a stator for an electrical device having at least one rotating element, said stator comprising a plurality of pole pieces which collectively form a hollow cylinder, said pole pieces each comprising a plurality of laminations arranged flatwise in an axial stack having two ends; a molded end piece insulator abutting each of said ends; said laminations and said end piece insulators having plan outlines substantially congruent with one another, said laminations and said end piece insulators jointly and severally comprising an inner arcuate portion forming a part of the inner surface of said cylinder, an outer arcuate portion forming a part of the outer surface of said cylinder, and a winding leg portion joining said inner and outer arcuate portions, said end piece insulators including shoulder portions comprising outer shoulder portions adjacent said outer arcuate portions and inner shoulder portions adjacent part of said inner arcuate portions, said outer shoulder portions having four side surfaces and one end surface, said shoulder portions extending away from said stack with one of said side surfaces normal and three of said side surfaces abnormal to the plane of said end piece insulator; two terminal pins having portions thereof embedded in one of said outer shoulder portions, the unembedded portions of said pins extending substantially axially away from said end surface; and a coil having two coil ends, said coil being wound about said winding leg portion, said ends of said coil being secured to said terminal pins, said abnormal side surfaces providing long leakage paths between terminals on adjacent segments and between terminals on said segments and said stator housing.

3. In an electrical device having at least one rotating element, a plurality of pole pieces which collectively form a cylindrical stator, said pole pieces each comprising a plurality of laminations arranged flat-wise in an axial stack having two ends; a molded end piece insulator abutting each of said ends; said laminations and said end piece insulators having plan outlines substantially congruent with one another, said laminations and said end piece insulators jointly and severally comprising an inner arcuate portion forming a part of the inner surface of said cylinder, an outer arcuate portion forming a part of the outer surface of said cylinder, and a winding leg portion joining said inner and outer arcuate portions, said end piece insulators including coil retaining shoulder portions extending away from said stack in substantially an axial direction, said shoulder portions comprising outer shoulder portions adjacent said outer arcuate portions and inner shoulder portions adjacent part of said inner arcuate portions; coil means having a plurality of turns and at least two ends, said coil means being wound about said winding leg portion and disposed between and retained by said inner and outer shoulder portions; and insulation means disposed between said coil and the winding leg portion of said stack.

4. A plurality of pole pieces which collectively form a hollow cylindrical stator for an electrical device, said pole pieces each comprising a plurality of laminations arranged flat-wise in an axial stack having two ends and two radial sides, an end piece insulator comprising a winding portion and shoulder portions abutting each of said ends, insulation means disposed adjacent to said sides, terminal means secured to said end piece insulators, and a plurality of turns of wire having at least two connecting ends, said turns being wound around said sides and said winding portions and disposed between and retained by said shoulder portions, said connecting ends being connected to said terminal means.

5. A plurality of pole pieces which collectively form a hollow cylindrical stator for an electrical device, said pole pieces each comprising a plurality of laminations arranged flat-wise in an axial stack having two ends and two radial sides, an end piece insulator comprising a winding portion and shoulder portions abutting each of said ends, insulation means disposed adjacent to said sides, terminal means secured to one of said shoulder portions, and a plurality of turns of wire having at least two connecting ends, said turns being wound around said sides and said winding portions and disposed between and retained by said shoulder portions, said connecting ends being connected to said terminal means.

6. A plurality of pole pieces which collectively form a hollow cylindrical stator for an electrical device, said pole pieces each comprising a plurality of laminations arranged flat-wise in an axial stack having two ends and two radial sides, an end piece insulator comprising a winding portion and shoulder portions abutting each of said ends, insulation means disposed adjacent to said sides, and a plurality of turns of wire having at least two connecting ends, said turns being wound around said sides and said winding portions and disposed between and retained by said shoulder portions.

7. A plurality of pole pieces which collectively form a hollow cylindrical stator for an electrical device, said pole pieces each comprising a plurality of laminations arranged flat-wise in an axial stack having two ends and two radial sides, an end piece insulator comprising a winding portion and shoulder portions abutting each of said ends, insulation means disposed adjacent to said sides, terminal means secured to one of said end piece insulators, and a plurality of turns of wire having at least two connecting ends, said turns being wound around said sides and said winding portions and disposed between and retained by said shoulder portions, said connecting ends being connected to said terminal means.

8. In a stator for a multi-pole electrical device, a plurality of pole pieces which collectively define a cylindrical opening, said pole pieces comprising a magnetic member having two axial ends, an end piece insulator abutting each of said ends, terminal means secured to one of said insulators, and a coil having at least two connecting ends formed about said magnetic member and said insulators, said connecting ends being connected to said terminal means.

9. In a stator for a multi-pole electrical device, a plurality of pole pieces which collectively define a cylindrical opening, said pole pieces comprising a laminated magnetic member having two axial ends, an end piece insulator abutting each of said ends, terminal means secured to said insulators, and a plurality of coils having at least two connecting ends, said coils being wound about said magnetic member and said insulators, said connecting ends being connected to said terminal means.

10. In a stator for a multi-pole electrical device, a plurality of pole pieces which collectively define a cylindrical opening, said pole pieces comprising a magnetic member having two axial ends, an end piece insulator abutting each of said ends, a plurality of terminal pins having portions thereof embedded in said insulators, and a plurality of coils having a plurality of connecting ends, said coils being wound about said magnetic member and said end piece insulators, said plurality of connection ends being connected to the unembedded portions of said plurality of terminal pins.

References Cited in the file of this patent

UNITED STATES PATENTS

| Number | Name | Date |
|---|---|---|
| 1,584,502 | Apple | May 11, 1926 |
| 1,647,372 | Pressley | Nov. 1, 1927 |
| 1,984,036 | Schwartzman | Dec. 11, 1934 |
| 2,412,254 | Edelman | Dec. 10, 1946 |